Patented June 1, 1937

2,082,491

UNITED STATES PATENT OFFICE 2,082,491

LIQUID TREATMENT

Walter H. Green, Chicago, Ill., assignor by mesne assignments, to Infilco Inc., a corporation of Delaware No Drawing. Application December 19, 1934, Serial No. 758,265

4 Claims. (Cl. 210—24)

The present invention pertains to the treatment of aqueous liquids, and has particular reference to a process designed for the treatment of industrial water in such a manner as to effect a removal therefrom of compounds of a certain class.

The various waters employed for commercial purposes contain in solution inorganic salts picked up from various sources, principally from contact with the earth. A certain class of these compounds, namely, the alkaline compounds, has proven particularly objectionable from many standpoints in industrial processes. A vast literature exists in which is described processes and apparatus for the treatment of water to render it more suitable to the purpose for which it is intended. However, heretofore there has been no satisfactory process applicable to the alkaline compounds as a group and, in particular, there has been no satisfactory process for effecting a complete removal from industrial water of the component elements or radicals of the alkaline compounds.

A principal object of the present invention is the provision of an efficient and economically feasible process for the treatment of water to remove therefrom alkaline compounds and the components thereof.

An additional object is the treatment of water in such a manner as to effect a chemical conversion of the alkaline compounds into a second chemical combination and to effect an additional chemical change in the nature of the second chemical combination, whereby to eliminate from the water the original components of the alkaline compounds without replacing such compounds by other compounds.

A further object is to provide a two-step process for the treatment of water, in which in the first step the positive ions of the alkaline compounds of the water are removed from the water by substitution and in the second steps the negative ions are removed from the water by a reaction other than substitution.

A still further object is the provision of a process for treating aqueous solutions in such a manner as to convert the alkaline compounds thereof into a form in which the compounds may be eliminated by a chemical change other than substitution from the water upon the water being employed in an industrial process.

Another object of the invention is to provide a process for the removal of both components of the alkaline compounds of water without the production of a sediment or deposit.

These and further objects will be apparent from a consideration of the following description of the invention.

In most waters employed for industrial purposes the alkaline compounds may exist in numerous forms, and ordinarily any particular water will contain a mixture of the different forms of alkaline compounds. In so far as the positive radicals of the alkaline compounds are concerned, these will be composed of the members of the alkali metal group, such as sodium and potassium, and of the alkaline earth group, such as calcium, magnesium, and the like. The negative radicals with which these elements may be combined are carbonates, bicarbonates, and hydroxides. In the case of the alkali metals, the negative radicals may be composed of one or a mixture of compounds of the groups referred to. Carbonates of the alkaline earth metals, particularly calcium, are less soluble, and it will be understood that calcium is present in the water in a soluble form such as calcium bicarbonate or calcium hydroxide. Where water containing calcium bicarbonate, for example, is employed in an industrial process in which the water is subjected to heating, the bicarbonate may be broken down with the formation of objectionable calcium carbonate, the latter being insoluble and precipitating. In the production of ice, the alkaline compounds have a recognized objectionable action. Reference might be made to various other objections to alkaline compounds.

Magnesium and calcium bicarbonates customarily are removed from water by treatment with lime, the calcium being precipitated as calicum carbonate, and the magnesium as magnesium hydroxide. This lime treatment is widely used because of its efficiency and economy. It has, however, three important limitations. First, the reactions involved are incomplete and, particularly when the reactions are carried out in the cold, the residual calcium carbonate and magnesium hydroxide may be in excess of the theoretical solubilities. Second, there is a need for varying the proportion of lime fed to the water being treated to compensate for the fluctuation of the composition of the raw water. Third, fairly large reaction and sedimentation tanks are necessary.

For the treatment of alkaline compounds of the alkali metals an acid reactant may be added to the water, but in such case the alkaline compounds merely are converted to neutral salts, which salts may be equally or more objectionable than the alkaline compounds.

In accordance with my invention, I have found that the entire group of alkaline compounds in water may be efficiently and economically treated whereby to effect a complete removal of the compounds and their component parts from the water by a process other than sedimentation. The invention is based on the discovery that the alkaline compounds may be carried through a two-step chemical reaction, whereby to remove the positive radical, element or ion in one step by substitution and to produce thereby a chemical compound which may be broken down or dissociated by a chemical reaction other than substitution in such a manner as to effect substantially complete removal of the substituted positive radical and the original negative radical as well by a process other than sedimentation, thereby producing a water that is entirely free from the objections incident to the presence of alkaline compounds.

In operation, the first step of the process consists in removing the positive element of the alkaline compounds by a chemical reaction involving substitution and at the same time converting the negative radicals into a form which will permit of removal of both components of the new compounds without producing sedimentation or precipitation. For this purpose the metallic elements of the alkaline compounds are replaced by ammonium, as by contacting water containing the objectionable alkaline compounds with an ammonium zeolite, the ammonium of the zeolite effecting in a known manner an exchange with the positive elements of the alkaline compounds to produce a zeolite of the alkaline elements and ammonium compounds with the negative radicals in the water.

This preliminary step is combined with and followed by a second operation in which the ammonium compounds with the negative radicals of the alkaline compounds are destroyed in such a manner as to remove the negative radicals from the water without the production of a deposit and by a process other than substitution. It will be observed that in the first step no reduction in dissolved solids is effected, since equivalent quantities of compounds present in the raw water are found in the treated water.

This replacement of the positive elements of the alkaline compounds by ammonium preferably may be carried out in a pressure system wherein a differential is maintained, as distinguished from the gravity system under which the lime treatment process ordinarily is effected.

The water containing the converted ammonia compounds is an intermediate product produced for the purpose of further treatment. After replacement by substitution of the metallic elements of the alkaline compounds the water containing the intermediate alkaline ammonia compounds is subjected to one or more additional steps by which the components of the alkaline compounds are removed without the production of a precipitate and by a process other than substitution. A preferred method of effecting the second step of the process is to subject the water to a temperature sufficiently high to break down the ammonium compounds and to drive the components thereof out of the water. In the case of hydroxides it will be understood that additional water will be formed and reference herein to removing the negative components of the alkaline compounds from the water will be understood as including the formation of additional water therefrom. The water is boiled and the increased temperature and vapor pressure result in a rapid destruction or dissociation of the ammonium compounds and a distillation of the component parts thereof. Ammonium carbonate and bicarbonate will distill as ammonia and carbon dioxide, while, as stated heretofore, ammonium hydroxide will be converted into water and ammonia, the latter distilling.

Resort may be had to other methods such as aeration for effecting the second step of destruction or dissociation of the ammonium compounds and the removal of the components thereof without the formation of a precipitate and by a process other than substitution.

Each of the suggested steps operates in the manner described, although the boiling method is preferred.

A particular advantage of my process is that it may be combined with many industrial processes in which it is desired to employ water freed from the components of alkaline compounds, the combination being made in such a manner that an essential step of the industrial process may, without substantial change, be employed at little or no additional expense for effecting the secondary reaction of my process and removal of the components of the alkaline compounds. More particularly, the industrial process itself may be used for the purification of the water to be employed therein, thereby enabling the industrial process to carry a large part of the burden of purification at no additional expense.

An example of this combination of the purification process with an industrial process may be had in the case of steam generation. Alkaline compounds notoriously are objectionable in boilers, since, due to precipitation by decomposition or concentration, the compounds form deposits which clog the boiler and cause scale, foaming, caustic embrittlement or other objectionable condition. In accordance with my invention, the raw water containing alkaline compounds is subjected to the substitution step in which the positive elements of the alkaline compounds are replaced by ammonium. Thereafter, the water is passed to the boiler where its temperature is raised to the boiling point in the generation of steam. The boiler conditions cause destruction of the alkaline ammonium compounds and the liberated ammonia passes off with the steam. In this manner concentration of compounds in the boiler is prevented and long periods of efficient operation are possible without the necessity of periodic cleaning or removal of deposits. Special means may be employed for removing the ammonia from the boiler distillate, if desired.

It will be apparent at once to one skilled in the art that other aqueous liquids may be similarly treated to qualify or improve them for various uses. In such cases the combination of steps as described will be found of particular utility. The base exchange value of ammonium zeolites is such as to insure an efficient production of intermediate compounds which may be broken up and removed without the formation of a deposit.

The particular process conditions of the secondary step may be varied widely. The extent of dissociation and vaporization of the ammonium compounds will depend upon such factors as the nature of the secondary step of the process and the use to which the water is to be put.

The various possible changes in and applications of my process as described herein which are possible without departing from the scope of the invention are intended to be included in the appended claims.

I claim:

1. The process of treating an aqueous liquid containing an alkaline compound of a metal for use in industry, which comprises subjecting said liquid to a primary treatment by contacting the same with a material having positive ion exchange properties and capable of reacting with the alkaline compound to form a compound of the metal with the exchange material and a second compound capable of being dissociated in the presence of water into constituents all of which other than water are volatilizable from water, and then volatilizing and removing such constituents from the liquid before use of the liquid.

2. The process of treating an aqueous liquid containing an alkaline bicarbonate of a metal for use in industry, which comprises subjecting said liquid to a primary treatment by contacting the same with a material having positive ion exchange properties and capable of reacting with the alkaline bicarbonate to form a compound of the metal with the exchange material and a bicarbonate capable of being dissociated in the presence of water into constituents all of which other than water are volatilizable from water, and then volatilizing and removing such constituents from the liquid before use of the liquid.

3. The process of treating an aqueous liquid containing an alkaline compound of a metal for use in industry, which comprises subjecting said liquid to a primary treatment by contacting the same with ammonium zeolite to form a compound of the metal with the zeolite and an ammonium compound capable of being dissociated in the presence of water into constituents all of which other than water are volatilizable from water, and then volatilizing and removing such constituents from the liquid before use of the liquid.

4. The process of treating an aqueous liquid containing an alkaline bicarbonate of a metal for use in industry, which comprises subjecting said liquid to a primary treatment by contacting the same with ammonium zeolite to form a compound of the metal with the zeolite and ammonium bicarbonate, decomposing the ammonium bicarbonate, and then removing the products of the decomposition of the ammonium bicarbonate other than water in a gaseous form from the liquid before use.

WALTER H. GREEN.